(12) United States Patent
Shwartz et al.

(10) Patent No.: US 8,392,444 B2
(45) Date of Patent: Mar. 5, 2013

(54) SYSTEM AND METHODS FOR USING SHORT-HAND INTERPRETATION DICTIONARIES IN COLLABORATION ENVIRONMENTS

(75) Inventors: Larisa Shwartz, Scarsdale, NY (US); Jonathan Lenchner, North Salem, NY (US); Genady Grabarnik, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/471,503

(22) Filed: May 15, 2012

(65) Prior Publication Data
US 2012/0226493 A1 Sep. 6, 2012

Related U.S. Application Data

(62) Division of application No. 12/058,877, filed on Mar. 31, 2008.

(51) Int. Cl.
*G06F 7/00* (2006.01)
*G06F 17/30* (2006.01)
(52) U.S. Cl. ..................... 707/765; 707/759
(58) Field of Classification Search ........... 707/759–779
See application file for complete search history.

(56) References Cited

U.S. PATENT DOCUMENTS

| | | | |
|---|---|---|---|
| 4,041,467 A | 8/1977 | Cota et al. | |
| 4,858,170 A | 8/1989 | DeWick, Sr. et al. | |
| 5,404,507 A * | 4/1995 | Bohm et al. .................... | 1/1 |
| 5,466,072 A | 11/1995 | McCready | |
| 5,970,492 A | 10/1999 | Nielsen | |
| 5,991,742 A | 11/1999 | Tran | |
| 6,049,799 A | 4/2000 | Mangat et al. | |
| 6,105,036 A | 8/2000 | Henckel | |
| 6,282,508 B1 | 8/2001 | Kimura et al. | |
| 6,345,245 B1 | 2/2002 | Sugiyama et al. | |
| 6,748,585 B2 | 6/2004 | Proebsting et al. | |
| 6,785,869 B1 | 8/2004 | Berstis | |
| 6,795,822 B1 | 9/2004 | Matsumoto et al. | |
| 6,934,767 B1 | 8/2005 | Jellinek | |
| 7,366,500 B1 | 4/2008 | Yalovsky et al. | |
| 7,716,201 B2 * | 5/2010 | Joshi ............................ | 707/706 |
| 2003/0014448 A1 | 1/2003 | Castellanos et al. | |
| 2004/0205672 A1 | 10/2004 | Bates et al. | |
| 2005/0240391 A1 | 10/2005 | Lekutai | |
| 2007/0038634 A1 * | 2/2007 | Glover et al. ................... | 707/10 |
| 2007/0050351 A1 * | 3/2007 | Kasperski et al. ............... | 707/4 |
| 2008/0215541 A1 * | 9/2008 | Li et al. ........................... | 707/3 |
| 2008/0281578 A1 | 11/2008 | Kumaran et al. | |
| 2009/0144260 A1 * | 6/2009 | Bennett et al. ................... | 707/5 |

* cited by examiner

*Primary Examiner* — Samuel G Neway
(74) *Attorney, Agent, or Firm* — Cahn & Samuels, LLP; Louis J. Percello

(57) ABSTRACT

A method for creating and using a short-hand interpretation dictionary in a collaboration environment includes creating or editing a document in a collaboration environment, said document comprising at least one short-hand notation; and replacing the at least one short-hand notation with an interpretation from at least one short-hand dictionary.

6 Claims, 8 Drawing Sheets

FIG. 2

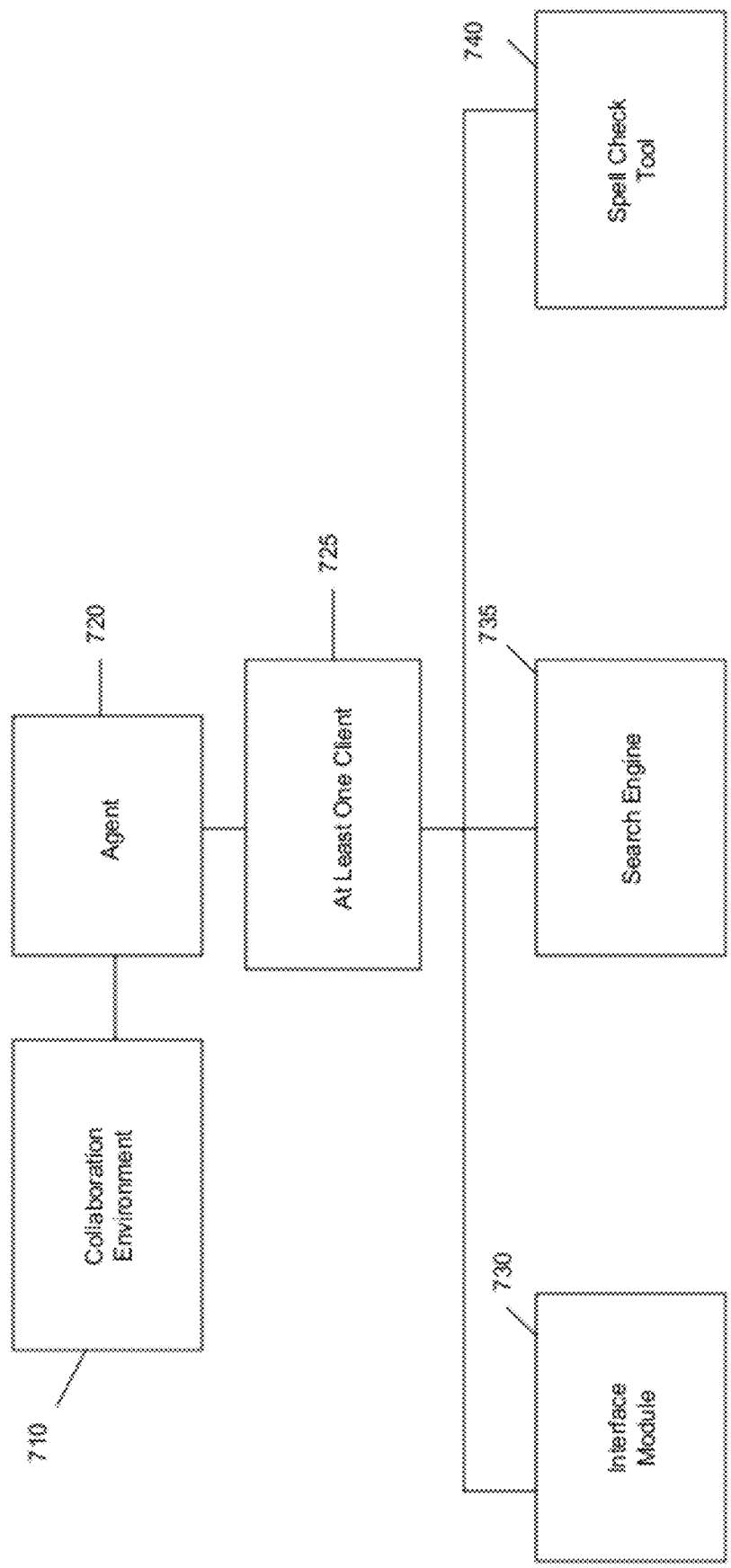

SYSTEM AND METHODS FOR USING SHORT-HAND INTERPRETATION DICTIONARIES IN COLLABORATION ENVIRONMENTS

This application is a divisional application of U.S. Ser. No. 12/058,877 filed on Mar. 31, 2008 in the U.S. Patent and Trademark Office, the entirety of which is incorporated herein by reference.

FIELD OF THE INVENTION

The present invention relates to a system and methods for creating and using short-hand interpretation dictionaries in collaboration environments.

BACKGROUND OF THE INVENTION

Short-hand or personally-established abbreviations are often used in situations when a person is capturing information in a free-style text under time pressure, with the understanding that the information captured will be used mostly by himself or herself. For example, one of the key performance indicators (KPIs) for a service desk personnel is the number of calls handled in a given time period, such as an eight hour day. Thus, incident/problem tickets heavily use short-hand abbreviations or expressions.

The processing of a free-style text by another user (or through automation) requires the interpretation of the short-hand notations or expressions. However, short-hand uses and interpretations vary, for example, by field lingo, group lingo, or personal lingo.

SUMMARY OF THE INVENTION

According to an aspect of the present invention, a method is provided for creating and using a short-hand interpretation dictionary in a collaboration environment. A document is created or edited in a collaboration environment, wherein the document comprises at least one short-hand notation. The at least one short-hand notation is replaced with an interpretation from at least one short-hand dictionary.

In another aspect of the invention, a method is provided for searching documents created in a collaboration environment. Search criteria is entered in a search engine for a database, wherein the search criteria comprises text comprising at least one of a short-hand notation or full words. The user's short-hand dictionary is searched according to the search criteria. If the search criteria comprises a short-hand notation, interpretations for the short-hand notation are obtained from the user short-hand dictionary. The search criteria is updated by adding the interpretations for the short-hand notation. The revised search criteria is passed to the server.

In another aspect of the invention, a system is provided for using a short-hand interpretation dictionary in a collaboration environment comprising an agent for a collaboration environment; at least one client; and at least one database for storing and indexing documents from the collaboration environment.

According to another aspect of the invention, a computer program product is provided comprising a computer useable medium having a computer readable program. When executed on a computer, the computer readable program causes the computer to create or edit a document in a collaboration environment, wherein the document comprises at least one short-hand notation; and replace the at least one short-hand notation with an interpretation from at least one short-hand dictionary.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the system and methods should become evident to a person of ordinary skill in the art.

BRIEF DESCRIPTION OF THE DRAWINGS

FIG. 2 is a screen shot of a service request using a hierarchical list of short-hand dictionaries according to an embodiment of the present invention.

FIG. 8 is a block diagram of an exemplary agent according to an embodiment of the present invention.

DETAILED DESCRIPTION OF THE DRAWINGS

Figure 1:
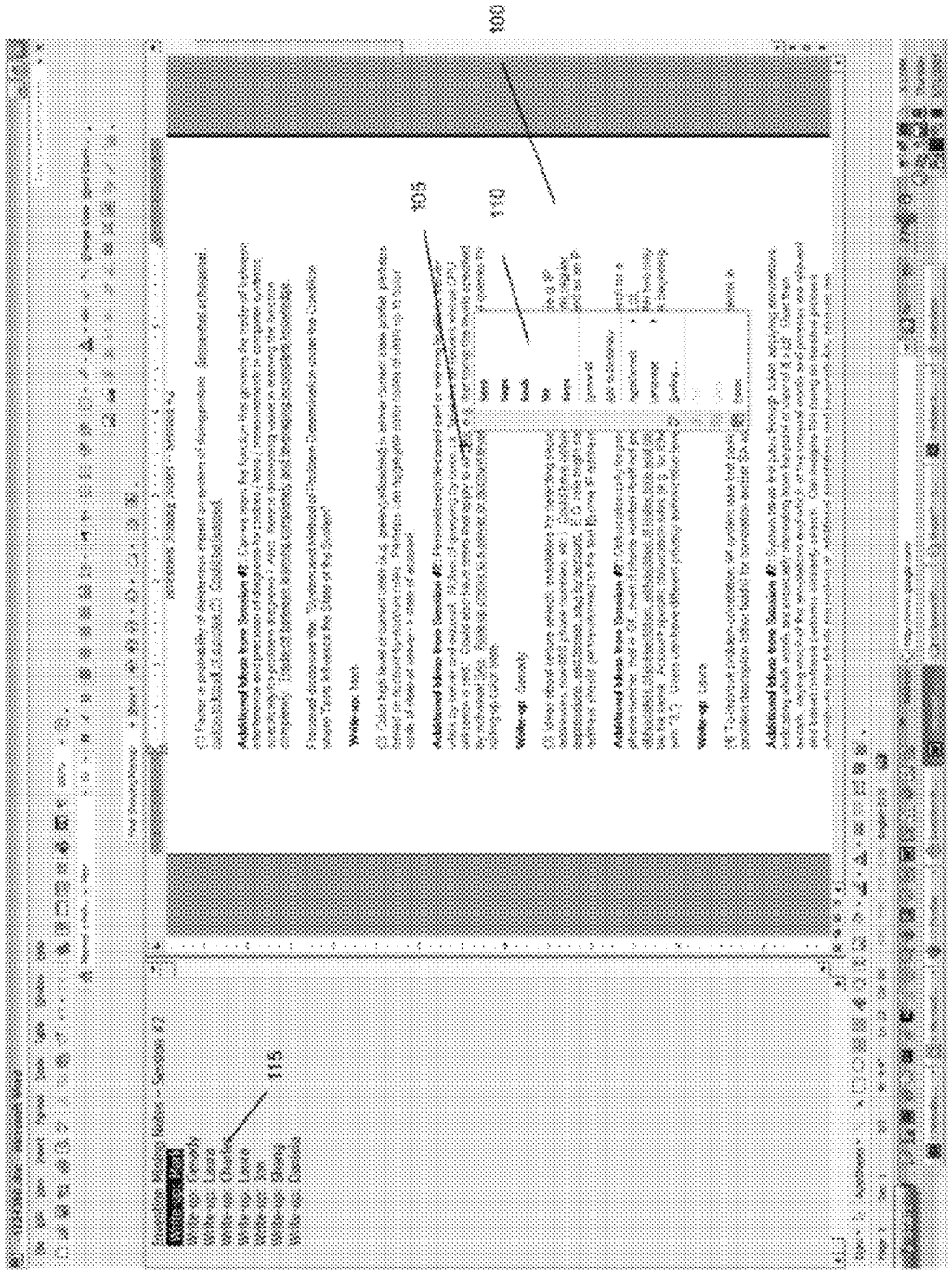
FIG. 1 is a screen shot of a document in a collaboration environment using short-hand dictionaries according to an embodiment of the present invention.

FIGS. 1-8 illustrate a system and methods for creating and using short-hand interpretation dictionaries in collaboration environments.

According to the present invention, a collaboration environment may include, but is not limited to, synchronous or asynchronous environments such as shared web applications, shared web experiences (e.g., blogs, wikis); shared web browsing, web shopping sites, instant messaging, text messaging, online bulletin boards, shared whiteboards, shared document production (e.g., word processor documents, service requests), discussion forums, discussion threads, voice over IP (e.g., conference call monitoring), and the like. In embodiments, the collaboration environment may be accessed by a networked computer system.

As used herein, a "document" in a collaboration environment may include, but is not limited to, files, text documents, pictures, movies, presentations, slides, spreadsheets, e-mails, prior conversations (e.g., chat transcripts), notes, service requests, screen recordings, mouse/keyboard recordings, or meetings between users of a collaboration environment.

According to the present invention, at least one short-hand interpretation dictionary or library may be used in a collaboration environment. The at least one short-hand dictionary may comprise user-specific short-hand notations (e.g., personally-established abbreviations) and the corresponding interpretation of the short-hand notations. In embodiments, an interpretation may include at least one of a corresponding full word, phrase, a definition, a synonym, or a pronunciation for a short-hand notation. A user may expand the vocabulary in a user-specific dictionary to include short-hand notations and interpretations.

In embodiments, the at least one short-hand dictionary may comprise an extension or add-on to a standard dictionary that is part of the at least one collaboration environment. In other embodiments, the at least one short-hand dictionary may comprise a stand-alone software program or may be part of a user's profile in the at least one collaboration environment.

According to the present invention, the at least one short-hand dictionary may be arranged or organized in a hierarchical configuration or list. For example, the at least one short-hand dictionary may comprise (1) a user-specific dictionary that is linked to or associated with (2) at least one additional short-hand dictionary, for example, at least one of a group, team, or organization short-hand dictionary. The hierarchical configuration helps eliminate redundancies in the short-hand dictionaries.

In embodiments, the at least one short-hand dictionary may comprise a configuration in which short-hand notations are categorized by at least one of area or field (e.g., network, security, telephony, legal, accounting, administrative, personnel) or process (change, configuration, incident) that is associated with at least one user. The categorization of short-hand notations may be rolled-up or incorporated within a hierarchical configuration of short-hand dictionaries, such as at least one of a team, group, or organization short-hand dictionary. In embodiments, a user may have the option of adjusting or selecting a categorization of a short-hand notation. The at least one short-hand dictionary may be role-based according to the role of a user of the collaboration environment (e.g., administrator, manager, employee).

The at least one short-hand dictionary may be automatically updated. In embodiments, when a short-hand notation is added to the at least one short-hand library, other short-hand dictionaries in a hierarchical configuration or list (e.g., user, team, field, process, role-based) may be updated.

The at least one short-hand dictionary may be automatically updated once a specific criteria is met, such as when a specific percentage (e.g., 70%) or number of users in a team, group, or organization has a common short-hand notation in their dictionaries. Similarly, the at least one short-hand dictionary may be automatically updated when a specific short-hand notation is used a set number of times for the same categorization (e.g., area or field). Thus, a more common short-hand notation may become the default or standard for a collaboration environment.

In embodiments, the at least one short-hand dictionary may be stored in a database. The at least one short-hand dictionary may be indexed in the database by at least one of notation, interpretation, user, team, group, field, process, or category. Similarly, a document from a collaboration environment that uses a short-hand notation may be saved or stored in the database and may be indexed by the at least short-hand dictionary.

According to the present invention, if a short-hand notation appears in a document in a collaboration environment, it may be replaced with an interpretation from the at least one short-hand dictionary. A possible interpretation of the short-hand notation may be displayed from the at least one short-hand dictionary. For example, if the short-hand notation already exists in a user's short-hand dictionary, replacement of the short-hand with the corresponding interpretation may be automatic. If a short-hand notation does not exist in the user's personal short-hand dictionary, possible interpretations may be suggested. A user may choose a suggested interpretation, for example, from a hierarchical list of short-hand dictionaries. In embodiments, the possible interpretations may be provided by a spell check feature as discussed below.

In other embodiments, automatic suggested interpretations for a short-hand notation may be based on the name or domain of a document (e.g., a document from a specific corporation may have a short hand notation TP, which for that context may correspond to Thinkpad). Suggested interpretations for a short-hand notation may be based on the content or context of the document (e.g., in a document regarding computer systems "nw" may be a short hand for network; whereas "nw" may be a short hand for notwithstanding in general documents). Suggested short-hand interpretations may be based upon the first letter of each word in a commonly used phrase or acronym. For example, a suggested interpretation of "ttyl" may be "talk to you later". Suggested short-hand interpretations may be based upon the first letter of each syllable of a commonly used word (e.g., wrls for wireless; w/o for without). A user of a collaboration environment has the option of turning any spell check or automatic suggestion feature on and off.

As illustrated in FIG. 1, a document 100 may have a short-hand notation 105 (e.g., SAs). When selecting the short-hand in the document, for example either by using a cursor or spell check feature, a list of possible interpretations 110 is automatically suggested or displayed from the at least one short-hand dictionary. The list of possible interpretations may be obtained from one user-specific short-hand dictionary or may comprise interpretations from all user dictionaries 115 connected with the document in the collaboration environment.

Figure 2:
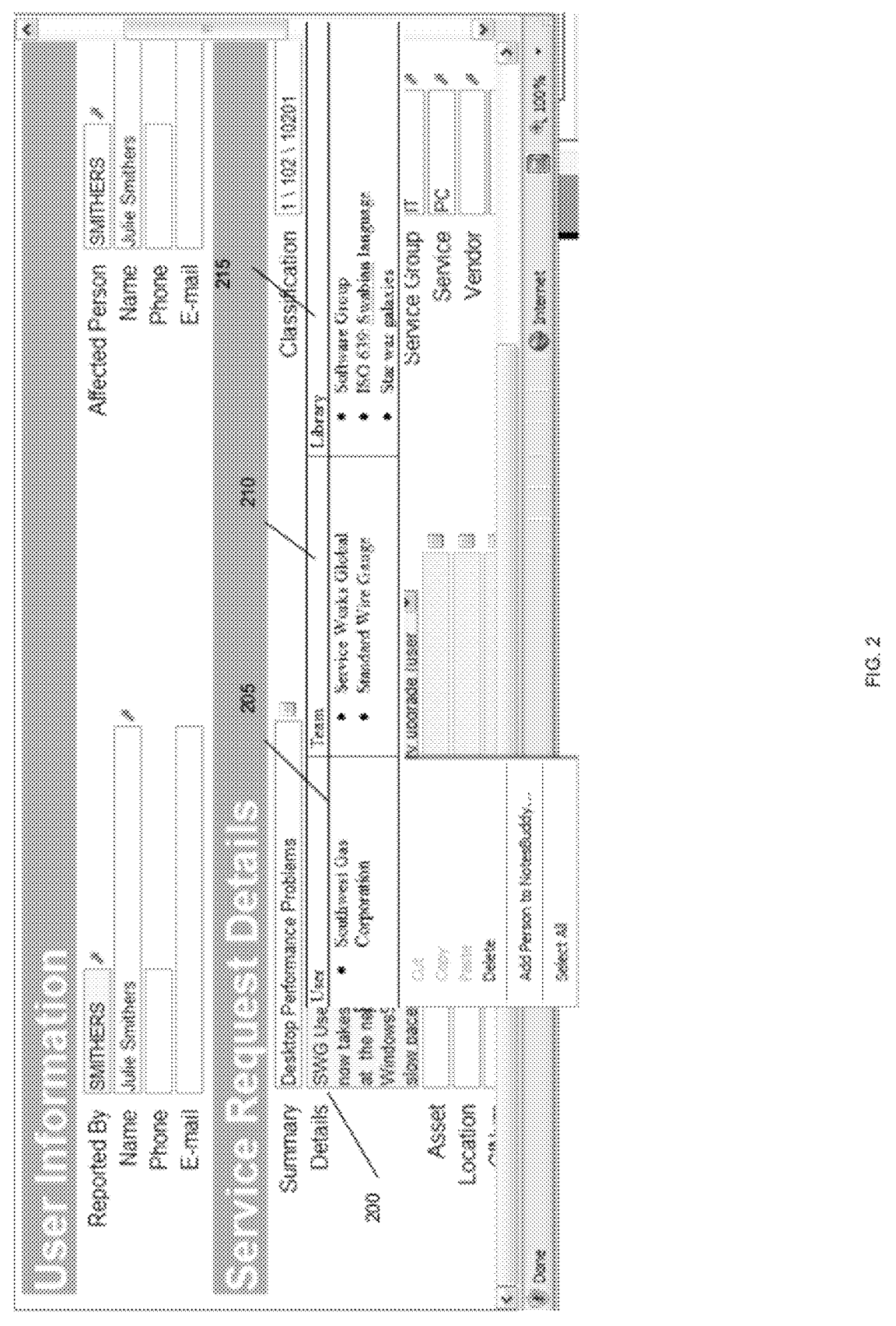

As illustrated in the service request document of FIG. 2, multiple possible interpretations for a short-hand notation 200 (SWG) in a document may be displayed from a hierarchical configuration of short-hand dictionaries, for example, from at least one of a user-specific short-hand dictionary 205; a team short-hand dictionary 210; or an organization short-hand dictionary 215. For example, the short-hand notation SWG may be Southwest Gas Corporation from a user-specific short-hand dictionary; Service Works Global or Standard Wire Gauge from a team short-hand dictionary; or Software Group, ISO 639: Swabian language, or Star war galaxies from an organization or enterprise-wide short-hand dictionary.

As illustrated in FIGS. 1-2, a user may create and edit a document, or may edit an existing document, in a collaboration environment. In embodiments, a user may utilize a spell check feature to recognize short-hand notations, particularly short-hand notations that are not currently in the user's short-hand library. The spell check features offers to replace the short-hand in the document with an interpretation or to add to the short-hand notations to the user's personal dictionary. Optionally, if a user does not replace the short-hand notation or adds it to the user-specific dictionary, the document may be annotated to automatically suggest an interpretation in the future. The spell check feature may prioritize multiple possible interpretations of a short-hand notation, for example, by user, team, field, or process.

Figure 3:
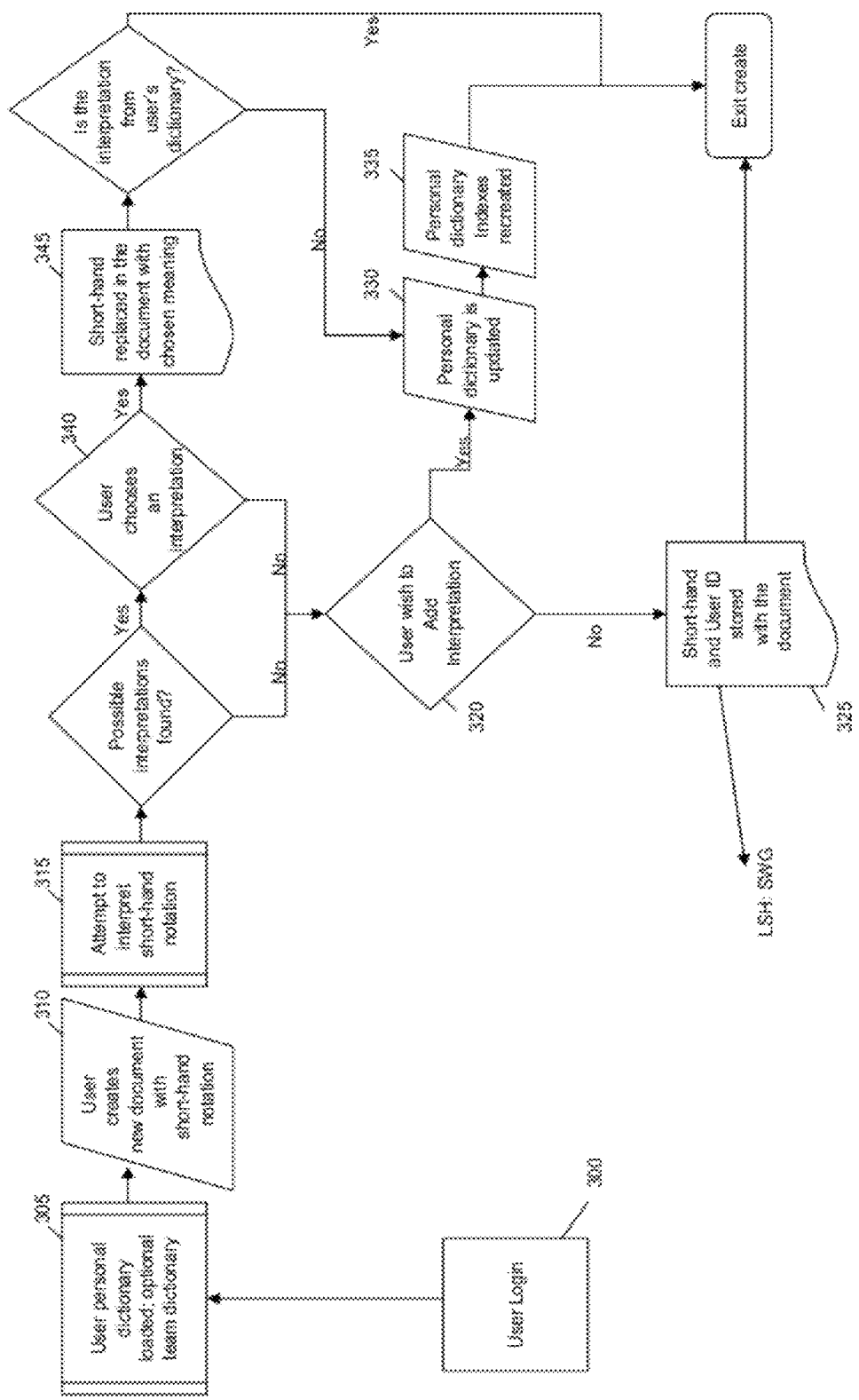
FIG. 3 is a flowchart for a user creating a document using short-hand in a collaboration environment according to an embodiment of the present invention.

FIG. 3 illustrates a user creating a document with a short-hand notation in a collaboration environment according to an embodiment of the present invention. It will be understood that this figure is illustrative and embodiments may include some or all of the steps. A user logs into a collaboration environment 300. The at least one short-hand dictionary is loaded, for example, the user's personal short-hand dictionary and optionally a team or other short-hand dictionary 305. The user creates a new document with a short-hand notation 310. According to the present invention, there is an attempt to interpret the short-hand notation 315.

If possible interpretations are not found, the user is asked if he or she wishes to add an interpretation for the short-hand notation 320. If the user chooses not to do so, the short-hand notation and the user's ID are stored along with the document when the document is saved (e.g.: LSH:SWG, wherein LSH is the user ID and SWG is the short-hand notation) 325. If the user adds an interpretation for the short-hand notation, the user's personal short-hand dictionary is updated 330 and the dictionary indexes are recreated 335.

If possible interpretations for the short-hand notation are found and the user chooses an interpretation 340, the short-hand notation is replaced in the document with the chosen meaning (e.g., full word, synonym, definition, or pronunciation) 345. If the interpretation is not from the user's personal dictionary, for example if the short-hand is from a team or field dictionary, the user's personal dictionary is updated 330 and the dictionary indexes are recreated 335.

Figure 4:
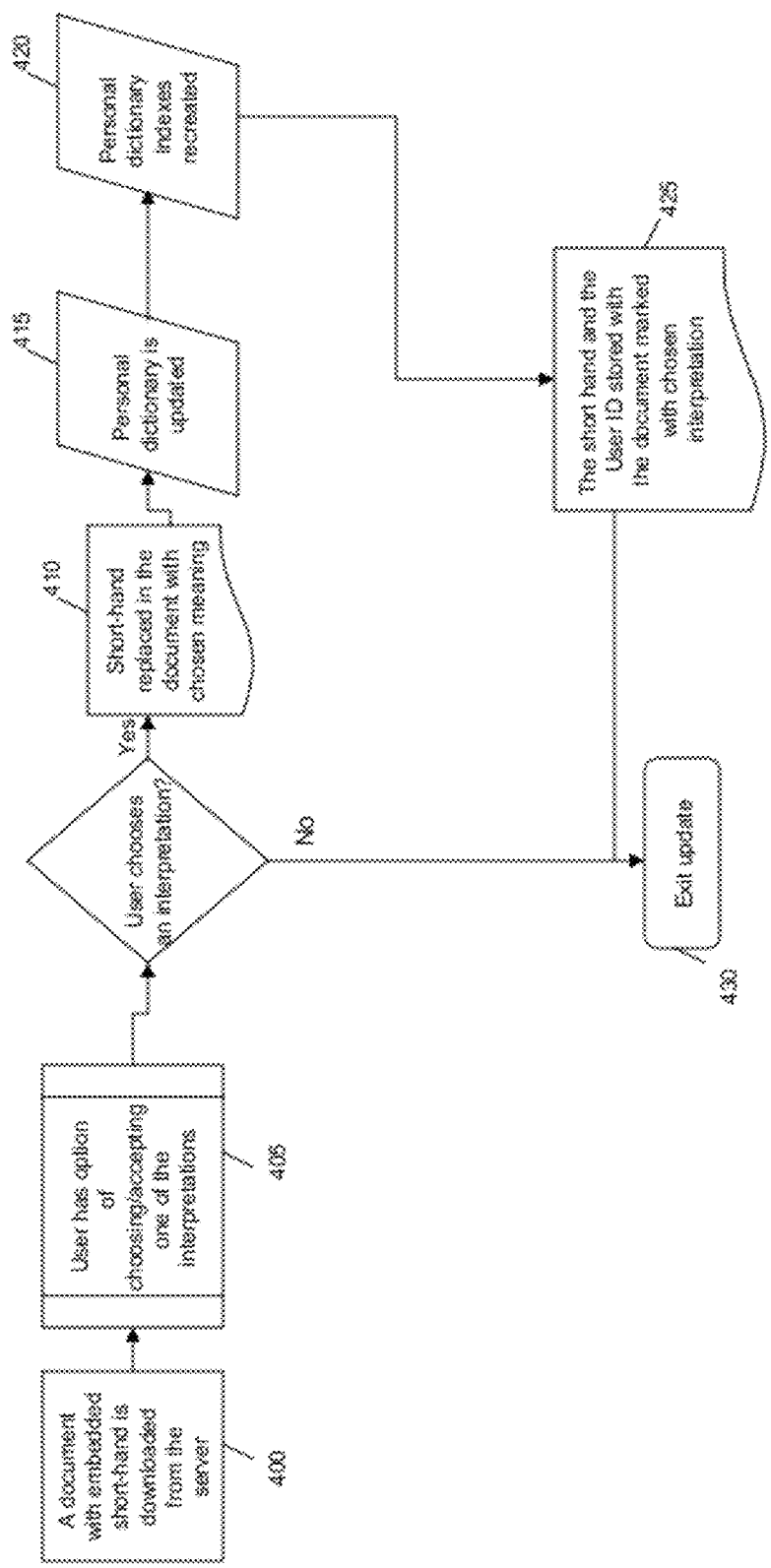
FIG. 4 is a flowchart for a user working with a document in a collaboration environment and updating a short-hand dictionary according to an embodiment of the present invention.

FIG. 4 illustrates a user working with an existing document in a collaboration environment and updating at least one short-hand dictionary according to an embodiment of the present invention. It will be understood that this figure is illustrative and embodiments may include some or all of the steps. A document embedded with a short-hand notation is downloaded from a server or accessed by a user in a collaboration environment 400. The user has the option of choosing an interpretation for the short-hand from the at least one short-hand dictionary or accepting an interpretation from an automatic spell-check or suggestion feature 405.

If the user chooses or accepts an interpretation from the at least one short-hand dictionary, the short-hand notation in the document is replaced with the chosen meaning 410. The user's personal short-hand dictionary is updated 415 and personal dictionary indexes are recreated 420. The short-hand notation and the user ID are stored with the document to mark the chosen interpretation 425. If the user does not choose an interpretation for the short-hand notation, the method for updating is exited 430.

Figure 5:
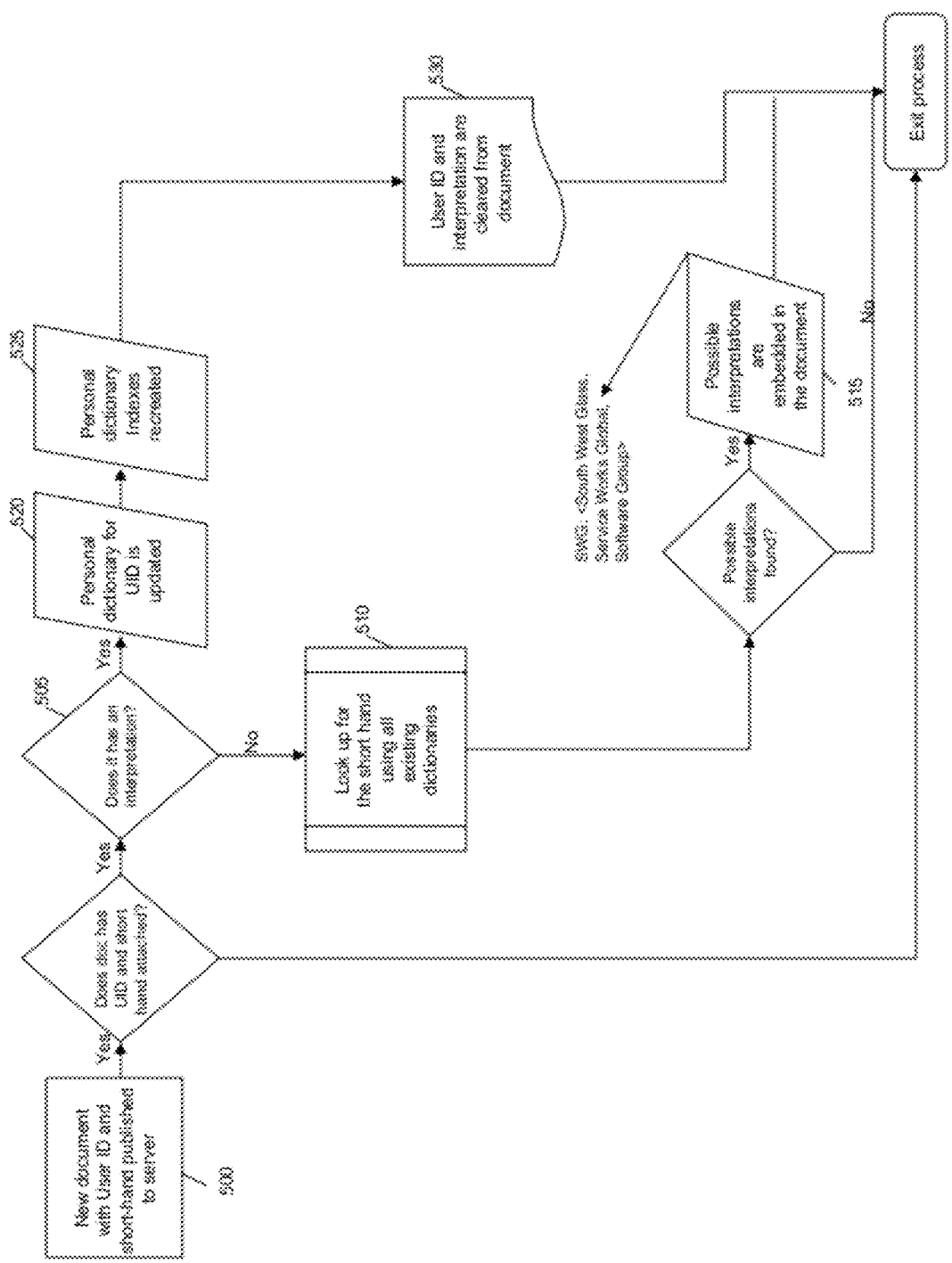
FIG. 5 is a flowchart for processing a document having short-hand on a server according to an embodiment of the present invention.
Figure 6:
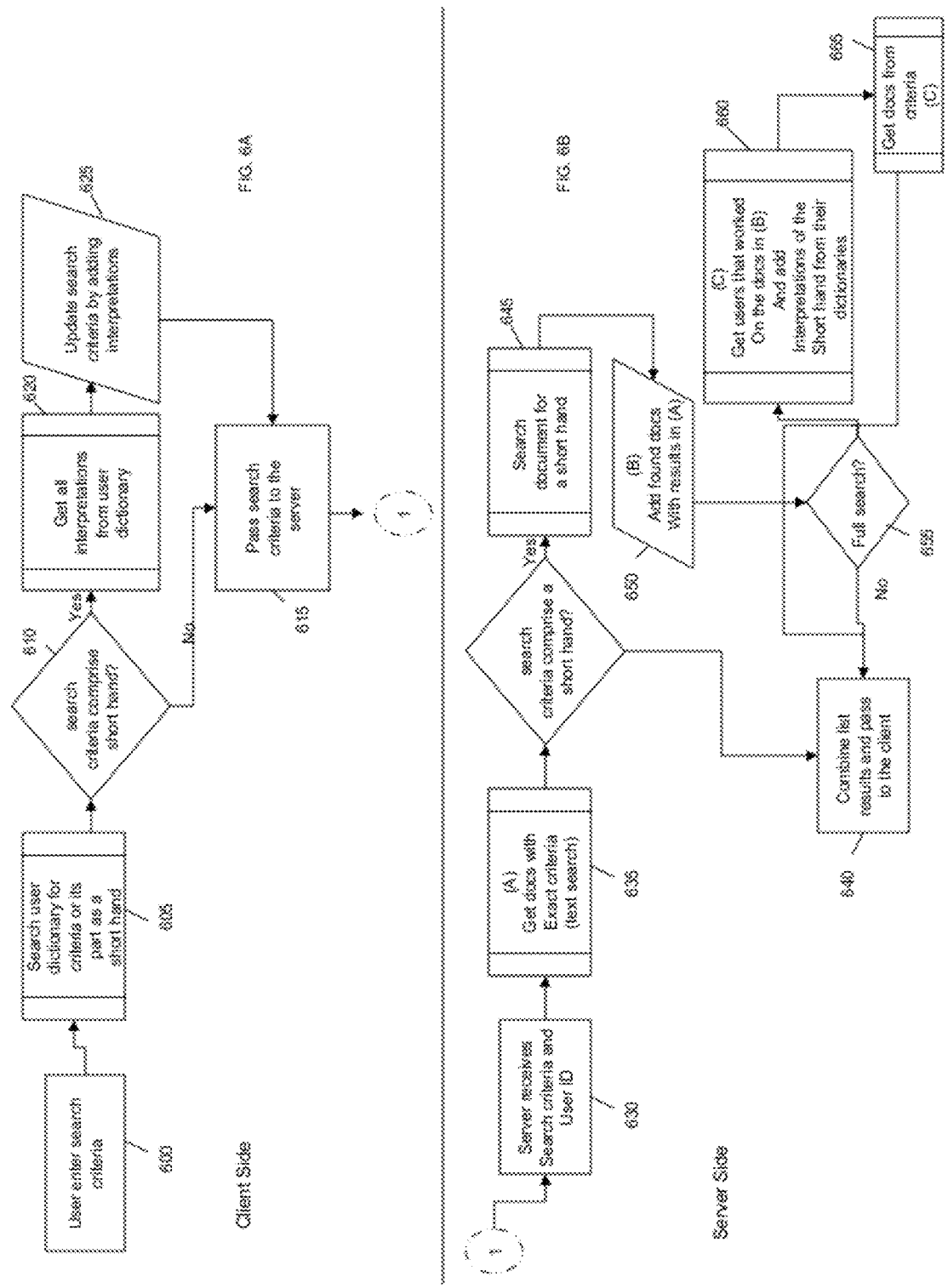
FIG. 6A is a flowchart for a user conducting a client side search according to an embodiment of the present invention.
FIG. 6B is a flowchart for conducting a server side search according to an embodiment of the present invention.

FIG. 5 illustrates processing a document having a short-hand notation on a server according to an embodiment of the present invention. It will be understood that this figure is illustrative and embodiments may include some or all of the steps. A document with a user ID and a short-hand notation is published to a server from a collaboration environment 500. If the document comprises a user ID and an attached short-hand notation, the system proceeds to determine whether the short-hand notation has an interpretation 505.

If the short-hand notation does not have an already specified interpretation, all existing short-hand dictionaries are searched for a meaning 510. If possible interpretations are found, the possible interpretations are embedded in the document 515. For example, the short-hand notation SWG is shown as SWG: <South West Glass; Service Works Global; Software Group>.

If possible interpretations for the short-hand notation are found in other dictionaries, the user's personal dictionary is updated 520, the personal dictionary indexes are recreated 525, and the user ID and interpretation are cleared from the document 530.

According to the present invention, a user may search a database comprising at least one document using search criteria. The at least one document may be indexed by a short-hand notation included in the document or by at least one short-hand dictionary.

The search criteria may comprise text comprising at least one of short-hand notation or full words. The search finds or locates documents in the database. In embodiments, a user may choose the level of search, for example, by choosing the scope of the at least one short-hand dictionary to be searched. For example, the user may choose a limited search that applies to a specific user, team, or group; or that a search applies to a particular category (e.g., field, area, or process). A full search may include all categories or all short-hand dictionaries.

FIG. 6A is a flowchart for a user conducting a client side search according to an embodiment of the present invention. It will be understood that this figure is illustrative and embodiments may include some or all of the steps. A user enters search criteria into a search engine for the database 600.

The user's short-hand dictionary is searched according to the search criteria or the search criteria's part as a short-hand notation 605. If the search criteria does not comprise a short-hand notation 610, the search criteria is passed to the server or database 615.

If the search criteria comprises a short-hand notation, all interpretations for the short-hand notation are obtained from the user short-hand dictionary 620. The search criteria is updated by adding the interpretations for the short-hand notation 625. The updated search criteria is then passed to the server or database 615.

FIG. 6B is a flowchart for conducting a server side search according to an embodiment of the present invention. It will be understood that this figure is illustrative and embodiments may include some or all of the steps. Once the server receives the search criteria or updated search criteria and the user ID 630, documents are located comprising the exact search criteria (e.g., text search) (A) 635. If the search criteria does not comprise a short-hand notation, a list of search results is passed to the user/client 640.

If the search criteria comprises a short-hand notation whose interpretation was not found the user dictionary in 625, documents are searched for the short-hand notation 645 pursuant to a limited search. Located documents comprising the short-hand notation (B) are combined with the documents (A) 650. If the user does not wish to conduct an expanded search or full search 655, the documents (A) and (B) are combined and passed to the user/client 640.

If an expanded or full search is desired, all users that worked on the located documents (B) and their short-hand dictionaries are examined, and interpretations of the short-hand notation are added to the search criteria 660. Documents comprising the updated search criteria are obtained (C) 665, and combined with the documents (A) and (B) and provided to the user/client 640.

Figure 7:
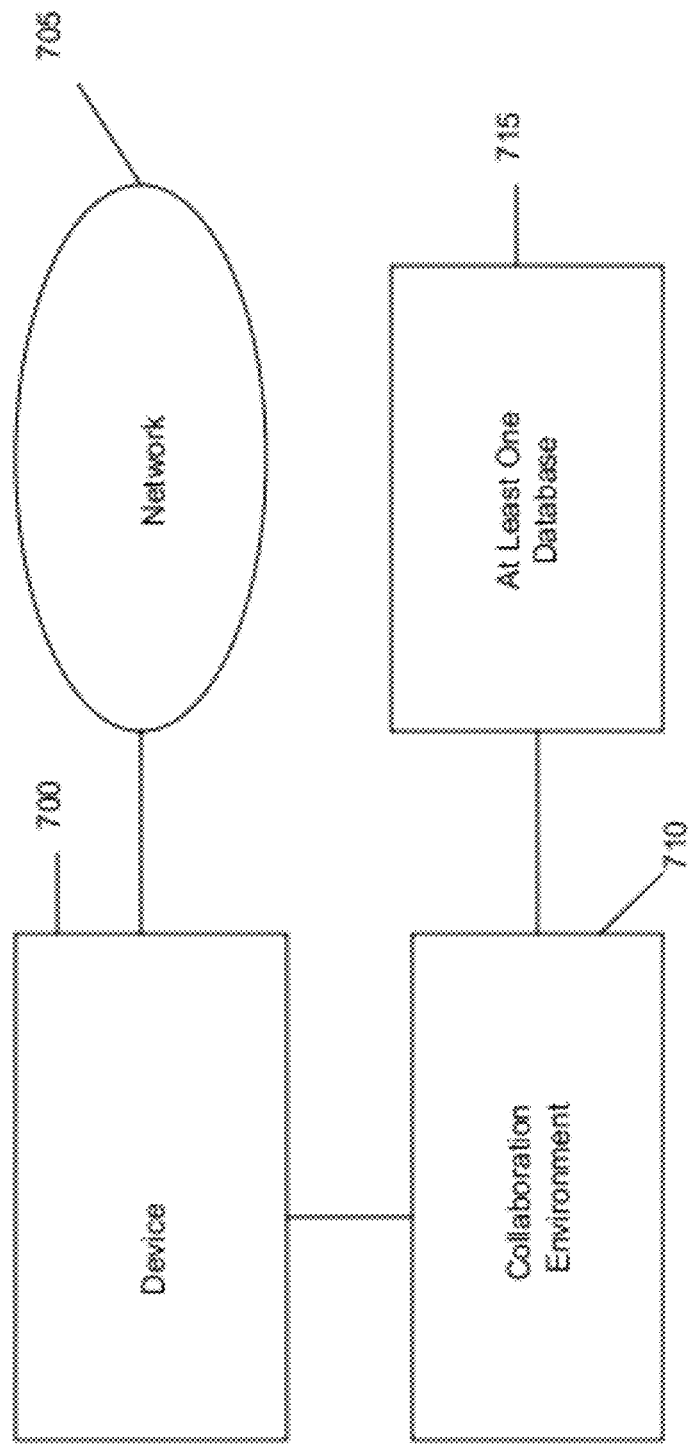
FIG. 7 is a block diagram of a system according to an embodiment of the present invention.

FIG. 7 is a block diagram showing an illustrative system of the invention. The illustrative system includes at least one electronic or digital device 700 (e.g., a personal computer, cellular telephone, personal digital assistant or PDA, game device, MP3 player, television) to access a collaboration environment. The device may be connected to a network 705 (e.g., the Internet, local area network (LAN), wide area network (WAN)). In embodiments of the invention, the system includes at least one collaboration environment 710 which may be an application residing on a server and at least one database 715 for storing and indexing documents from the collaboration environment. The illustrative system is but one example, and one of ordinary skill in the art would recognize that many other variations may exist, all of which are contemplated by the invention.

FIG. 8 illustrates an exemplary agent 720 for a collaboration environment which includes at least one client 725 comprising an interface module 730, for example a graphical user interface (GUI), by which users may input and exchange information in a collaboration environment; a search engine 735 for searching documents in the at least one database; and a spell check or suggestion tool 740 for suggesting interpretations for short-hand notations. In embodiments, the agent and its clients may be applications residing on at least one of the electronic or digital devices accessing the at least one collaboration environment. Alternatively, the search engine may reside on a separate server, either its own server or the server on which the collaboration environment resides. The search engine may be any search engine capable of locating documents, for example, Yahoo® or Google® search engines.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for searching documents created in a collaboration environment, comprising:
   a user entering search criteria in a search engine for a database comprising documents of users of a collaboration environment, wherein the search criteria comprises a short-hand notation;
   searching the user's short-hand dictionary according to the search criteria, wherein interpretations for the short-hand notation found in the user short-hand dictionary are obtained;
   updating the search criteria by adding obtained interpretations for the short-hand notation; and
   passing the updated search criteria to a server, said server receiving the updated search criteria, locating documents in the database comprising the updated search criteria, and providing a list of located documents to the user;
   wherein if the updated search criteria comprises a short-hand notation whose interpretation was not found in the user dictionary, documents are searched for the short-hand notation; locating documents in the database comprising the short-hand notation; combining the located documents comprising the short-hand notation with the located documents comprising the updated search criteria; and passing the combined located documents to the user;
   wherein if the updated search criteria comprises a short-hand notation whose interpretation was not found in the user dictionary and a full search is desired, searching the short-hand dictionaries of all users working on the located documents comprising the short-hand notation; adding interpretations of the short-hand notation from their short-hand dictionaries to the search criteria; locating documents in the database comprising the updated search criteria; and passing the located documents to the user.

2. A method according to claim 1, wherein the user chooses a level of search by choosing the scope of the short-hand dictionaries to be searched.

3. A method according to claim 1, wherein the updated search criteria further comprises a user ID.

4. A method according to claim 2, wherein a user chooses a level of the search by choosing a specific user, team, group, or category.

5. A method according to claim 1, wherein said documents comprise files, text documents, pictures, movies, presentations, slides, spreadsheets, e-mails, prior conversations, notes, service requests, screen recordings, mouse/keyboard recordings, or meetings.

6. A method according to claim 1, wherein said collaboration environment comprises shared web applications, blogs, wikis, web shopping sites, instant messaging, text messaging, online bulletin boards, shared whiteboards, shared document production, discussion forums, discussion threads, or voice over IP.

* * * * *